(12) United States Patent
Treharne et al.

(10) Patent No.: US 6,181,026 B1
(45) Date of Patent: Jan. 30, 2001

(54) VEHICLE IMMOBILIZER SYSTEM FOR ELECTRONIC ENGINE CONTROL

(75) Inventors: William David Treharne, Livonia, MI (US); Edward Michael Coultate, Harlow; Steven Barry Rougier, Upminster, both of (GB)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/329,271

(22) Filed: Jun. 28, 1999

(51) Int. Cl.[7] .................................................. B60R 25/04
(52) U.S. Cl. .................................. 307/10.3; 307/10.1
(58) Field of Search ........................ 307/9.1, 10.1, 307/10.2, 10.3, 10.5, 10.6; 123/179.1, 179.2, 179.3, 179.16, 179.18, 198 B, 198 DC; 340/426, 428, 541, 568

(56) References Cited

U.S. PATENT DOCUMENTS

| | | |
|---|---|---|
| 5,519,376 * | 5/1996 | Iijima .................................. 340/426 |
| 5,539,260 | 7/1996 | Khangura et al. . |
| 5,637,929 | 6/1997 | Treharne . |
| 5,677,664 * | 10/1997 | Sawinski .............................. 340/426 |
| 5,703,413 | 12/1997 | Treharne . |
| 5,801,616 | 9/1998 | Ghazarian et al. . |

* cited by examiner

Primary Examiner—Stephen W. Jackson
Assistant Examiner—Sharon Polk
(74) Attorney, Agent, or Firm—Mark L. Mollon

(57) ABSTRACT

An engine immobilizer has an armed state in which it disables an engine and a disarmed state in which it does not disable the engine. The immobilizer disarms when an authorized security code is received from a transponder during an attempt to start the engine. The controller for the engine immobilizer monitors engine-running sensors and switches to the armed state if the engine-running sensors indicate that the engine is not running even though the ignition switch has not been detected to have been put in the off position.

16 Claims, 3 Drawing Sheets

VEHICLE IMMOBILIZER SYSTEM FOR ELECTRONIC ENGINE CONTROL

BACKGROUND OF THE INVENTION

The present invention relates to an engine immobilizer operative with an electronically controlled engine, and more specifically to detection of actual engine running conditions in order to re-arm the immobilizer.

Use of automotive vehicle security systems employing RF-interrogated transponders has become widespread. Transponders may typically be embedded in the head of a key with a shank for operating a standard mechanical lock on a steering column, for example. Each transponder has a unique digital security code which is transmitted to a vehicle security module and then compared to authorized codes stored within the vehicle security module. The security module may be a stand-alone module or may be more typically incorporated into an electronic engine control module which performs the engine control functions and executes an appropriate engine control strategy.

The engine immobilizer function includes an armed state and a disarmed state as determined by immobilizer software executed within the security module. In the armed state, the engine is disabled by preventing engine control functions from operating (e.g., by disabling the spark distribution system and/or the fuel injection system). In the disarmed state, the engine is not disabled and engine control functions are permitted to proceed.

When the ignition switch of the vehicle is turned off, power is normally removed from the security module. When power is then re-applied to the security module, the immobilizer initializes in the armed state so that the vehicle cannot be operated until a transponder has been interrogated and a matching unique security code has been detected. In response to the match, the immobilizer enters the disarmed state.

In order to ensure continued safe operation of a vehicle, the events which lead to a re-arming of the immobilizer (i.e., switching to the armed state) must be carefully considered. For example, re-arming could occur based upon monitoring of the position of the ignition switch so that the immobilizer would be re-armed upon detection of the ignition switch being put in the off position. However, a fault in the conductor line for monitoring ignition switch position might cause a re-arming and disabling of the engine at a time when the engine should otherwise continue operating. Thus, prior art security modules have instead re-armed based upon actual switching off of power to the module.

On the other hand, a fault may occur which prevents switching off of power to the security module, even though the ignition switch has been turned off and the operator has left the vehicle. For example, many electronic engine control modules are supplied power from a power relay (either electromechanical or fully electronic switching) which is driven from the ignition switch. If the relay becomes stuck on (e.g., a frozen solenoid or a short-circuited transistor), power may be continuously supplied to the electronic engine control. If the immobilizer function is contained in the electronic engine control module, then the immobilizer function may fail to re-arm. Since other critical engine components such as fuel injectors may receive their power by means other than the power relay for the electronic engine control module, the engine may still stop so that the operator does not notice anything unusual when shutting off the engine and leaving the vehicle. In other words, the driver turns off the ignition switch and the vehicle engine stops because a critical engine component other than the engine control module loses power. However, the electronic engine control module merely detects a stall condition and does not re-arm the immobilizer.

The engine immobilizer function may also be implemented within a separate security module which is in communication with the engine control module. Such a separate security module may have its power supplied through a relay and would be subject to the same problem.

SUMMARY OF THE INVENTION

The present invention monitors engine conditions using various sensors to determine whether the immobilizer should be re-armed. By waiting a fixed delay after detecting an engine off condition, re-arming will not occur during an on-road stall, for example.

In one aspect of the invention, an engine immobilizer for an engine in a vehicle having an ignition switch with at least an off position and an on position is provided. A transponder is coded with a unique security code and is to be in the possession of an authorized user of the vehicle. A transceiver is mounted in the vehicle for interrogating the transponder to obtain the security code. At least one engine-running sensor is mounted in the vehicle detecting whether or not the engine is running. A controller is coupled to the transceiver and the engine running sensor and stores at least one authorized security code. The controller has an armed state during which it disables the engine and has a disarmed state during which it does not disable the engine. In response to an attempt to start the engine by activating the ignition switch, the controller in the armed state causes the transceiver to interrogate for the unique security code, detects existence of a match between the unique security code and the authorized security code, and switches to the disarmed state if a match exists. The controller while in the disarmed state monitors the engine-running sensor and switches to the armed state if the engine-running sensor indicates a predetermined event even though the ignition switch is not detected to be in the off position (i.e., power to the module has not been interrupted). The predetermined event is preferably comprised of the engine being in a non-running condition for a predetermined period of time.

DETAILED DESCRIPTION OF PREFERRED EMBODIMENTS

Figure 1:
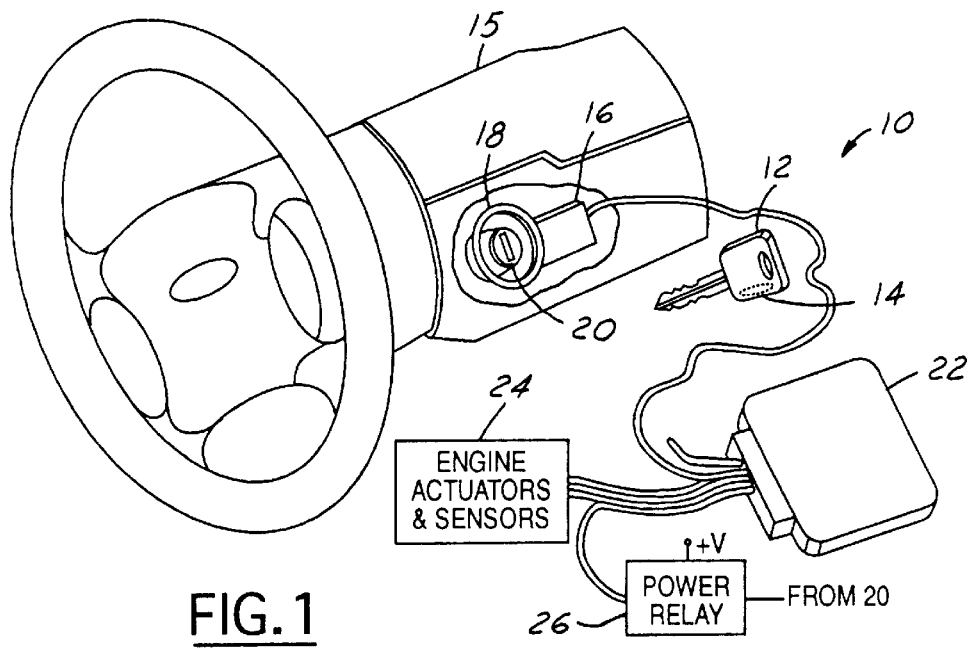
FIG. 1 shows a vehicle security system coupled with an electronic engine controller.

Referring to FIG. 1, an automotive vehicle security system shown (commonly known as a passive anti-theft system) is generally indicated at 10. The security system includes an ignition key 12 having a transponder 14 embedded in the head of the key. A transceiver 16 is mounted in a steering column 15 and is connected to an antenna coil 18 which is installed surrounding an ignition switch 20. Transceiver 16 is connected to an electronic engine control module 22 which includes software for implementing the passive anti-theft functions. Module 22 also controls the vehicle engine via its connection to a plurality of engine actuators and sensors 24. Module 22 receives power from battery voltage +V through a power relay 26 which is controlled by ignition switch 20.

Engine sensors 24 provide data to electronic engine control module 22 for implementing an engine control strategy. Engine operation is directly controlled by module 22 via engine actuators 24 which may include ignition coils and fuel injectors, for example. Module 22 provides control signals to engine actuators 24 and may provide power directly for some actuators while other actuators use a separate source of power. Power relay 26 is used because module 22 draws a greater amount of current than is desirable to have pass through ignition switch 20.

Figure 2:
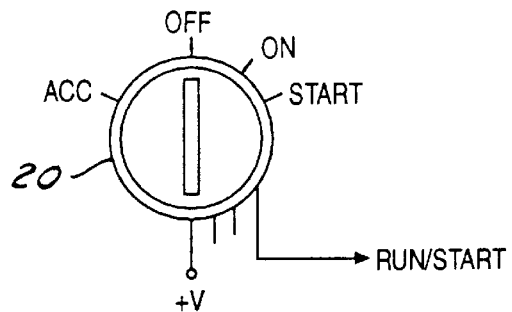
FIG. 2 is a diagram showing ignition switch positions.

The various positions of ignition switch 20 are shown in FIG. 2. Switch 20 includes a key-lock cylinder which may be moved into accessory, off, on, and start positions. An electrical switch structure is actuated by the cylinder in order to provide battery voltage to various combinations of outputs depending upon the position of the cylinder. For example, a run-start signal line assumes battery voltage +V when the cylinder is in either the on or start position. A run/accessory line (not shown) receives battery voltage when the cylinder is in those respective positions. Power relay 26 typically operates under control of the run/start signal.

Figure 3:
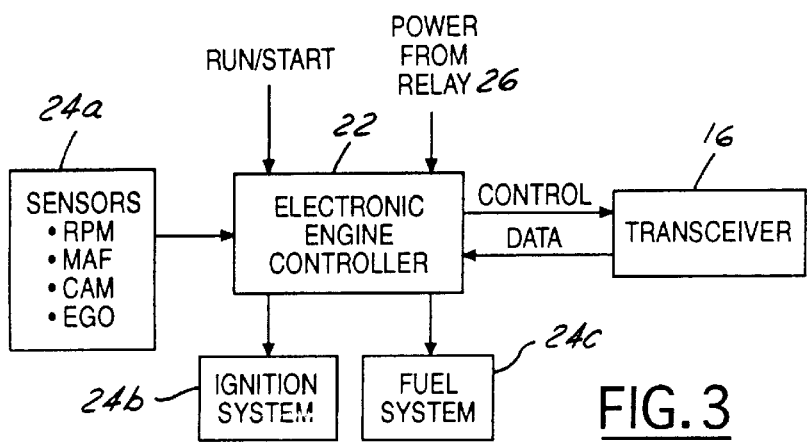
FIG. 3 is a block diagram showing the engine immobilizer system of the present invention.

Components of the immobilizer system are shown in more detail in FIG. 3. Electronic engine controller 22 receives power from relay 26. Controller 22 also monitors the run/start signal. Control signals are provided from electronic engine controller 22 to transceiver 16 in order to cause interrogation via RF signals to obtain a code from the transponder in a key inserted in the ignition switch. Data concerning transceiver status and any security code obtained by interrogation is coupled from transceiver 16 back to electronic engine controller 22. If a unique security code is obtained by transceiver 16 which matches at least one authorized security code stored in electronic engine controller 22, then engine operation is enabled by electronic engine controller 22. Signals from sensors 24a provide inputs to an engine control strategy. Outputs from the strategy operate in ignition system 24b and a fuel system 24c. Sensors 24a include a crankshaft position sensor, cam shaft position sensor, mass airflow (MAF) sensor, manifold absolute pressure (MAP) sensor, and heated exhaust gas oxygen (EGO) sensor, for example. A signal from any one sensor or a combination of signals from various sensors are also employed by the present invention to detect whether the engine is in fact operating at all. Other sensors and/or engine parameters may be employed to detect engine running conditions, as is known in the art.

Electronic engine controller 22 implements an immobilizer strategy having improved re-arming based on sensing of engine conditions. In particular, if engine sensors indicate that the engine has been off for a predetermined period of time, such as about 60 seconds, then the immobilizer re-arms itself unless the transponder with an authorized security code is still present. The use of a sufficiently long time period ensures that the immobilizer system will not activate during an on-road stall. By preventing the re-arming of the immobilizer system upon re-validated presence of an authorized security code, immobilizer operation is transparent to the vehicle user (i.e., it always allows them to operate their vehicle if they leave their ignition on with the engine not running).

Figure 4:
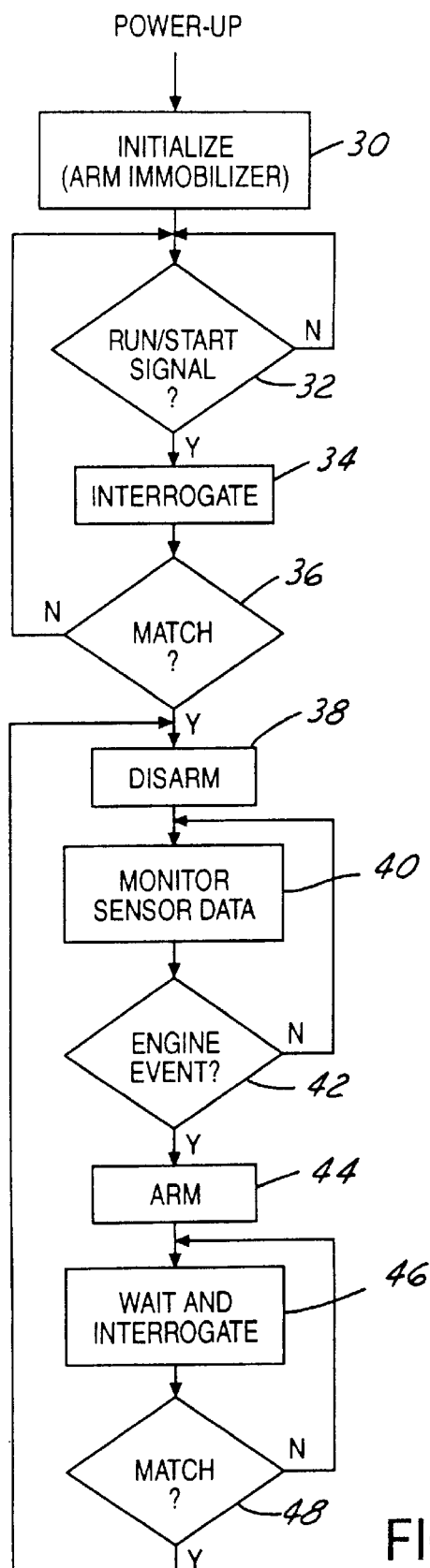
FIG. 4 is a flowchart showing a preferred method of the present invention.

Operation of the invention will be described in greater detail in connection with the flowchart of FIG. 4. Upon power-up of the electronic engine control module, the control software for the immobilizer is initialized in step 30. Specifically, the immobilizer is initially armed and the engine is disabled. In step 32, a check is made to determine whether the run/start signal is present. If not, then a return is made for further monitoring to detect the initiation of the run/start signal. Once the run/start signal has been detected, an RF interrogation by the transceiver is performed in step 34. A unique (and typically encrypted) security code stored in and/or generated by the transponder is processed in the electronic engine control module to determine whether it matches any stored authorized security code in step 36. If no match is detected, then the armed state is maintained (i.e., the engine continues to be disabled) and a return is made to step 32 to monitor for a run/start signal and further interrogations to identify when an authorized key and transponder are being used.

If a match is detected in step 36, then the immobilizer enters its disarmed state in step 38, thereby allowing engine operation to proceed. During engine operation, sensor data is monitored in step 40 to determine the engine status. A check is made in step 42 to determine whether a predetermined engine event has occurred which would indicate that a re-arming should occur. If no such event is detected, then a return is made to step 40 to further monitor the sensor data. If the predetermined event is detected, then the controller enters its armed state in step 44.

Once an engine has been disabled by re-arming in step 44, it is very desirable to maintain a quick response time when an authorized user attempts to re-start the vehicle. Thus, after a short wait period in step 46, further interrogation for an authorized transponder is performed. A typical wait period may be about two seconds. If a match is detected between a received unique security code and a stored authorized security code, then a return is made to the disarm state at step 38. If no match is obtained, then a return is made to step 46 for periodically re-interrogating for an authorized transponder following the short wait period.

Figure 5:
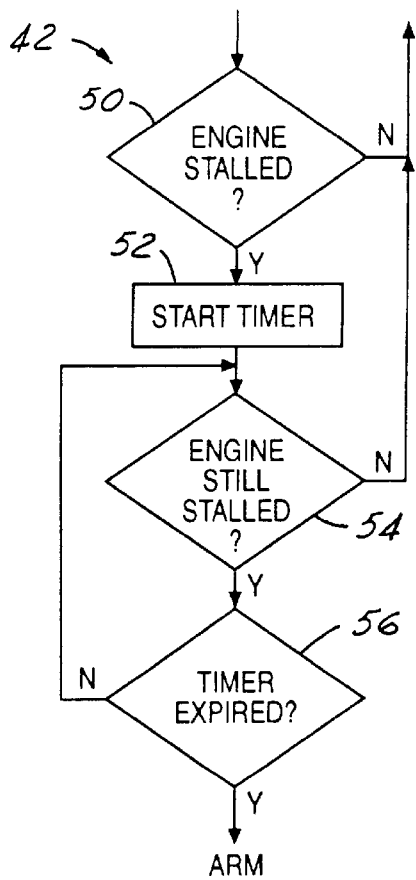
FIG. 5 is a flowchart showing the method of FIG. 4 in greater detail.

A preferred embodiment for the engine event of step 42 is shown in FIG. 5. In this embodiment, the predetermined engine event is an engine stall persisting for a predetermined time even though power through the ignition switch is apparently still available (as determined by the engine control module). Thus, a check is made in step 50 to determine if the engine has stalled or stopped. If the engine is still running, then a return is made to step 40 for further monitoring of sensor data. However, if sensor data indicates that the engine has stalled, then a timer is started in step 52. A check is made in step 54 to determine whether the engine is still stalled. If the engine is no longer stalled, then a return is made from step 54 to step 40 for further monitoring of sensor data. If the engine is still stalled, then a check is made in step 56 to determine whether the timer has expired. If the timer has not expired, then a return is made to step 54 to determine whether the engine is still stalled. If the timer has expired, then the immobilizer system is armed in step 44. A timer period of about 60 seconds or more is preferred in order to ensure that the immobilizer system does not activate during an on-road stall condition.

Detection of an engine stall condition using the engine sensors mentioned above may include testing for the condition of RPM being equal to zero. Alternatively, a stall condition can be detected by a mass airflow (MAF) sensor indicating no load, a cam position sensor providing no signal, or an HEGO sensor indicating an extremely lean condition (i.e., no fuel). Other sensors or a combination of signals from multiple sensors can also be used in order to detect when the engine is shut off.

Figure 6:
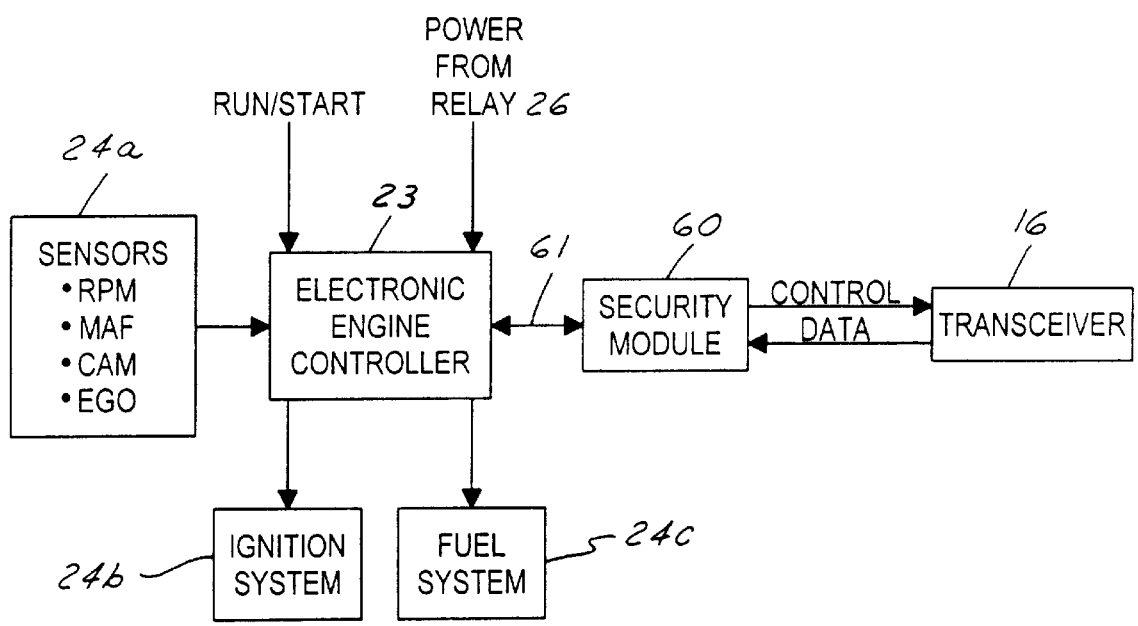
FIG. 6 is a block diagram showing an alternative embodiment of the invention using a separate security module.

FIG. 6 shows an alternative embodiment of the present invention wherein a separate security module 60 handles the immobilizer function. Security module 60 is connected by control and data lines to transceiver 16. A data link 61 interconnects security module 60 with electronic engine controller 23. When security module 60 is in its disarmed state, it sends an engine enabling signal to engine controller 23 over data link 61. The lack of an enabling signal from security module 60 may cause engine controller 23 to enter a disabled state. Security module 60 may also send a disabling signal to engine controller 23 when in its armed state.

Data link 61 also provides engine-running sensor data to security module 60, whereby security module 60 can detect an engine off condition and can re-arm itself if the engine off condition persists for the predetermined period of time.

What is claimed is:

1. An engine immobilizer for an engine in a vehicle, said vehicle having an ignition switch with at least an on position, said engine immobilizer comprising:
    a transponder coded with a unique security code to be in the possession of an authorized user of the vehicle;
    a transceiver mounted in said vehicle for interrogating said transponder to obtain said security code;
    at least one engine-running sensor mounted in said vehicle for detecting whether or not said engine is running; and
    a controller coupled to said transceiver and said engine running sensor and storing at least one authorized security code, said controller having an armed state during which it disables said engine and having a disarmed state during which it does not disarm said engine;
    wherein in response to an attempt to start said engine by activating said ignition switch, said controller in said armed state causes said transceiver to interrogate for said unique security code, detects existence of a match between said unique security code and said authorized security code, switches to said disarmed state if a match exists, and remains in said disarmed state while said engine is running; and
    wherein said controller in said disarmed state monitors said engine-running sensor and switches to said armed state if said engine running sensor indicates that said engine has stopped running even though said ignition switch is not detected to be in said off position.

2. The engine immobilizer of claim 1 wherein said controller switches to said armed state only after said engine has stopped running for a predetermined period of time.

3. The engine immobilizer of claim 1 wherein said controller switches to said armed state in response to said sensor having sensed that said engine has stopped running only after said controller again causes said transceiver to interrogate for said unique security code and it fails to obtain a match between said unique security code and said authorized security code.

4. The engine immobilizer of claim 2 wherein said predetermined period of time is equal to about 60 seconds.

5. The engine immobilizer of claim 1 wherein, after entering said armed state in response to said engine having stopped running, said controller causes said transceiver to interrogate for said unique security code periodically until it determines existence of a match between said unique security code and said authorized security code, at which time it then switches to said disarmed state and ceases interrogating for said unique security code.

6. The engine immobilizer of claim 1 wherein said engine-running sensor is comprised of an engine RPM sensor.

7. The engine immobilizer of claim 1 wherein said engine-running sensor is comprised of a mass airflow sensor.

8. The engine immobilizer of claim 1 wherein said engine-running sensor is comprised of a cam position sensor.

9. The engine immobilizer of claim 1 wherein said engine-running sensor is comprised of an exhaust gas oxygen sensor.

10. The engine immobilizer of claim 1 wherein said controller is comprised of an electronic engine control module having software for controlling the operation of said immobilizer.

11. The engine immobilizer of claim 1 wherein said controller is comprised of a security module and an electronic engine control module communicatively connected with said security module.

12. A method of controlling an engine immobilizer for an engine in a vehicle wherein an authorized user of said vehicle carries a transponder coded with a unique security code, wherein said vehicle includes a transceiver mounted in said vehicle for interrogating said transponder to obtain said security code, an ignition switch having at least an off position and an on position, a controller storing at least one authorized security code, and at least one engine-running sensor mounted in said vehicle detecting whether or not said engine is running, and wherein said controller has an armed state during which it disables said engine and has a disarmed state during which it does not disable said engine, said method comprising the steps of:
    interrogating for said unique security code in response to an attempt to start said engine by activating said ignition switch while in said armed state;
    detecting existence of a match between said unique security code and said authorized security code, switching to said disarmed state if a match exists and remaining in said disarmed state while said engine is running;
    while in said disarmed state, monitoring said engine-running sensor; and
    switching to said armed state if said engine-running sensor indicates that said engine has stopped running even though said ignition switch is not detected to be in said off position.

13. The method of claim 12, wherein said switching is performed after said engine has stopped running for a predetermined period of time.

14. The method of claim 12, wherein said switching to said armed state when said engine stops running occurs only after again interrogating for said unique security code and failing to obtain a match between said unique security code and said authorized code.

15. The method of claim 13 wherein said predetermined period of time is equal to about 60 seconds.

16. The method of claim 12 wherein, after switching to said armed state when said engine stops running, said transceiver interrogates for said unique security code periodically until it determines existence of a match between said unique security code and said authorized security code, at which time said controller switches to said disarmed state and ceases interrogating for said unique security code.

* * * * *